Dec. 12, 1967 M. W. LOMBARDI ET AL 3,357,137
WEATHER STRIP
Filed Aug. 2, 1965
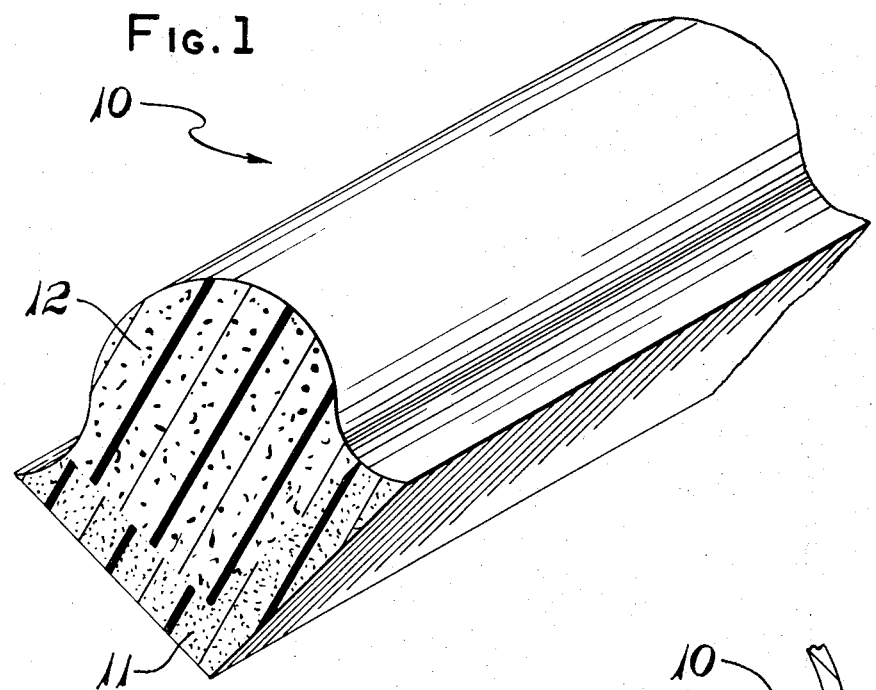
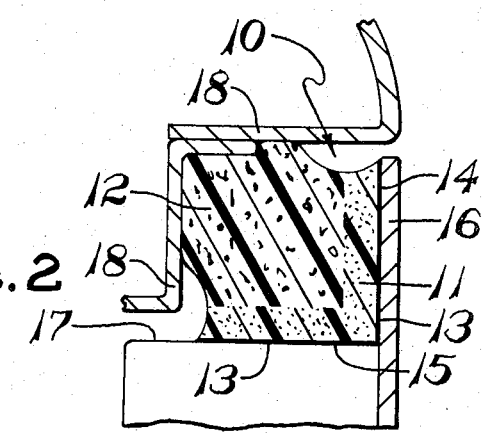
INVENTORS
MICHAEL W. LOMBARDI
JOSEPH M. KAPUSTA
BY
James R. Lindsay
ATTY.

United States Patent Office 3,357,137
Patented Dec. 12, 1967

3,357,137
WEATHER STRIP
Michael W. Lombardi, Derby, and Joseph M. Kapusta, Ansonia, Conn., assignors to The B. F. Goodrich Company, New York, N.Y., a corporation of New York
Filed Aug. 2, 1965, Ser. No. 476,360
4 Claims. (Cl. 49—475)

ABSTRACT OF THE DISCLOSURE

A flexible resilient weather strip for sealing the doors or trunk lid of an automobile is composed of both open-cell and closed-cell cellular materials. The surface of the weather strip adhered to the automobile surface is an open-cell resilient cellular material to promote a tenacious bond between the weather strip and the surface to which the weather strip is adhered while the surface of the weather strip that is in sealing engagement with an opposed automobile surface when the door or trunk lid of the car is closed and latched is a closed-cell resilient cellular material so that the weather strip will conform to imperfections in the automobile body against which the weather strip seats and will remain resilient and compressible even in extreme cold weather since moisture cannot penetrate into the closed-cell material.

---

This invention relates to a weather strip and pertains more particularly to a flexible resilient weather strip such as is used around the doors and trunk lid of an automobile to bridge the space between the automobile door or trunk lid and the automobile body and seal the interior of the automobile or of the trunk compartment against the entrance of water.

Customarily, weather stripping for use in sealing the doors and trunk lid of automobiles has consisted of an open-cell cellular rubber interior over which a relatively thin non-porous covering or "skin" has been formed during the course of manufacture or applied separately over a core of the cellular rubber. Although this construction of weather stripping had been employed by the automotive industry for a great many years, it has certain disadvantages which affect its ability to provide the desired sealing action. In the utilization of the weather stripping, the weather strip normally is adhered with an adhesive to the peripheral flange of the automobile door or trunk lid. When the door or trunk lid is closed and latched, the weather strip is compressed against an opposing surface of the automobile body and in such condition is intended to serve two functions, namely, (1) to seal any gap between the door or trunk lid and the automobile body, and (2) to prohibit actual contact of the door or trunk lid with the automobile body. It will be appreciated that neither the flange of the automobile door or trunk lid to which the weather strip is adhered nor the surface of the automobile body against which the weather strip is compressed, when the door or trunk lid is closed, is a perfectly smooth, uninterrupted surface, but instead will have deflections, weld-seams and other imperfections therein. To provide an effective seal, the weather strip will need to conform readily to the imperfections.

The customary weather strip described above does not conform to such imperfections to the degree desired since the "tough" skin cover tends to bridge over a depression or raised spot in the metal surface which causes incomplete sealing. Also, the adhesion of the non-porous skin cover to the metal surface of the automobile door or trunk lid has not been entirely satisfactory, resulting in the weather strip coming unadhered to the door or trunk lid and, thus, necessitating periodic re-adhering of the weather strip to the door or trunk lid.

While removal of the skin or cover layer from the weather strip provides a strip that can be more permanently bonded to the metal surface of the door or trunk lid and provides a strip which more readily conforms to the configurations of any imperfections in the surfaces of the automobile body against which the weather strip would be compressed, the open-cell structure of the weather strip with the skin or cover layer removed would allow moisture to penetrate into the weather strip. During freezing weather the weather strip, as a result, would become stiff and ineffective because of freezing of the water that has penetrated into the weather strip.

The use of a weather strip formed entirely of a resilient closed-cell cellular material would eliminate the problem of water penetration into the weather strip since the cells of the closed-cell material are non-communicating. However, although the sealing characteristics of a resilient closed-cell cellular weather strip have been determined to be quite satisfactory, the closed-cell cellular material does not adhere entirely satisfactorily to the metal surface of the door or trunk lid and often is pulled loose from the door or trunk lid after a relatively short period of use.

The present invention provides a weather strip which not only can be tenaciously adhered to the automobile door or trunk lid but which also effectively seals the space between the door or trunk lid and automobile body when the door or trunk lid is closed and latched. In accordance with this invention, the weather strip is provided with open-cell resilient cellular material adjacent those surfaces to which the weather strip is to be adhered and with closed-cell resilient cellular material adjacent those surfaces against which the weather strip is compressed when the door or trunk lid is closed. The open-cell resilient cellular material of the weather strip allows the weather strip to be tenaciously adhered to the flange of the door or trunk lid while the closed-cell resilient cellular material conforms to any imperfections in the automobile body against which the weather strip seats, and remains resilient and compressible even in extreme cold weather since moisture cannot penetrate into the closed-cell material.

The invention will be more fully understood by referring to the following description of a specific embodiment of this invention and to the drawing in which:

FIG. 1 is a perspective view of a weather strip embodying the present invention; and FIG. 2 is a section of the weather strip shown in FIG. 1 adhered to an automobile door and in sealing engagement against the automobile body.

Referring to the drawing, it will be realized that weather strip 10 is composed of two components 11 and 12, one of which (component 11) is intended to be adjacent to and attached to the automobile door or trunk lid and the other of which (component 12) is intended to be adjacent to and in sealing engagement with the automobile body when the door or trunk lid is closed and latched. Component 11 is formed of a resilient open-cell cellular material to facilitate bonding the weather strip 10 to the automobile door or trunk lid while component 12 is formed of a resilient closed-cell cellular material to facilitate a suitable sealing engagement with the automobile body and to insure that water does not penetrate into the sealing component 12 of the weather strip 10.

The component 11 of the weather strip 10 may be formed of any resilient open-cell cellular material, although preferably it is formed of a resilient open-cell natural or synthetic rubber composition (commonly referred to as "open-cell sponge rubber"). Although various procedures are well known for forming open-cell structures, the one most commonly employed involves the addition of a chemical blowing agent to the composition from which the open-cell cellular material is formed. Upon heating the composition, the chemical blowing agent is decomposed liberating a gas that causes the formation of minute cells throughout the composition. As is well known, whether an open-cell structure or a closed-cell structure is formed depends primarily on the physical properties of the composition at the time it is expanded. If the composition is quite plastic and has little strength when it is expanded, the walls of the cells will rupture and an intercommunicating cellular structure (open-cell structure) will result. In making a closed-cell gas-expanded rubber-like composition, the composition usually is partially vulcanized (at a temperature below that at which the blowing agent decomposes) before the composition is expanded in order to strengthen the composition and prevent the rupture of the cell walls as the composition is blown (thus forming a non-communicating or closed-cell cellular structure when the composition is expanded). Only that portion of weather strip 10 that is immediately adjacent the surfaces of the automobile door or trunk lid to which the weather strip is to be bonded need to be formed of the open-cell cellular material, the distance which the component 11 extends inwardly into the weather strip 10 from the bonding surface of the weather strip 10 generally being about from 1/16 to 3/16 inch.

Component 12 which when the door or trunk lid is closed conforms to the surface of the automobile body against which the weather strip is compressed and effects the seal may be formed of any resilient closed-cell cellular material, although resilient closed-cell cellular sponge materials made from a natural or synthetic rubber composition preferably is employed. Desirably, the cellular material of component 11 is somewhat stiffer than the cellular material of component 12 so that less strain will be exerted on the adhesive bond holding the weather strip 10 to the automobile door or trunk lid. It will be appreciated that the use of a stiffer material in component 11 will lessen the shearing stresses exerted on the adhesive bond when the door or trunk lid is closed and component 12 is compressed.

Components 11 and 12 of weather strip 10 may be formed separately and the two components cemented together in proper relationship, or one of the other of the components 11 and 12 can be preformed and united through vulcanization during the formation of the other component in a suitablbe mold, or unexpanded strips of suitable sponge-forming compositions may be caused to expand together in an appropriately shaped mold to form the two-component weather strip, the resulting two components being united together through vulcanization of the expanded compositions into an integral structure.

FIG. 2 of the drawing shows the weather strip 10 as it is actually used. Referring to FIG. 2, the weather strip 10 is shown to be adhered with a suitable adhesive 13 along its longitudinal bonding faces 14, 15 to the lip 16 of an automobile door and to the side face 17 of the automobile door. When the automobile door is closed the weather strip 10 is in sealing engagement with the automobile body 18. FIG. 2 illustrates how the sealing component 12 of weather strip 10 is distorted from its normal configuration in order to conform to the irregular surface of the automobile body 18 against which it is compressed.

When adhering the weather strip to the automobile door or trunk lid, the adhesive is applied either onto the surface of the door or trunk lid to which the weather strip is to be secured, or onto the surface or surfaces of the weather strip which are to be adhered to the automobile door or trunk lid or onto both the weather strip and the door or trunk lid. The weather strip then is pressed into adhering contact with the door or trunk lid. If desired, the weather strip can be attached to the door or trunk lid of the automobile with attaching clips that are anchored into the weather strip and have a projecting portion adapted to be secured in apertures in the metal body to which the weather strip is to be attached. The attaching clips can be used as the sole attaching means or can be used in addition to the adhesive.

If desired, a fabric reinforcing member extending lengthwise of the weather strip and disposed between the two components 11 and 12 of the weather strip can be employed to impart additional strength to the weather strip.

We claim:

1. A weather strip for attachment to an automobile door or trunk lid to bridge the space between the automobile door or trunk lid and the automobile body when the automobile door or trunk lid is closed and latched, said weather strip comprising a resilient open-cell cellular material component which when the weather strip is mounted to the automobile door or trunk lid is adjacent the surface of the automobile door or trunk lid to which the weather strip is physically attached, and a resilient closed-cell cellular material sealing component which is in sealing engagement with the automobile body when the door or trunk lid is closed and latched.

2. In combination, a flexible resilient weather strip mounted to the inner peripheral face of an automobile door or trunk lid for bridging the space between the automobile door or trunk lid and the automobile body when the automobile door or trunk lid is closed, said weather strip comprising a resilient open-cell cellular material component adjacent the inner peripheral face of the automobile door or trunk lid to which the weather strip is mounted and a resilient closed-cell material sealing component which is in sealing engagement with the automobile body when the door or trunk lid to which the weather strip is mounted is closed and latched.

3. In combination, a flexible resistant weather strip mounted to the inner peripheral face of an automobile door or trunk lid for bridging the space between the automobile door or trunk lid and the automobile body when the automobile door or trunk lid is closed, said weather strip comprising a resilient open-cell cellular material component adjacent the inner peripheral face of the automobile door or trunk lid to which the weather strip is mounted and a resilient closed-cell cellular material sealing component which is in sealing engagement with the automobile body when the door or trunk lid to which the weather strip is mounted is closed and latched, said open-cell cellular material component extending inwardly into said weather strip a distance from 1/16 to 3/16 inch.

4. In combination, a flexible resilient weather strip mounted to the inner peripheral face of an automobile door or trunk lid for bridging the space between the automobile door or trunk lid and the automobile body when the automobile door or trunk lid is closed, said weather strip comprising a resilient open-cell cellular material component adjacent the inner peripheral face of the automobile door or trunk lid to which the weather strip is mounted and a resilient closed-cell cellular material sealing component which is in sealing engagement with the automobile body when the door or trunk lid to which the weather strip is mounted is closed and latched, the resilient open-cell cellular material from which the said open-cell cellular material component is formed being stiffer than the closed-cell cellular material from which the said closed-cell cellular material sealing component is formed.

References Cited

UNITED STATES PATENTS

| | | | |
|---|---|---|---|
| 1,877,729 | 9/1932 | Chaffee | 49—488 |
| 2,357,513 | 9/1944 | Harmon | 49—485 |
| 2,599,440 | 6/1952 | Dudley | 49—485 X |
| 2,769,659 | 11/1956 | Perry et al. | 49—485 X |
| 2,790,070 | 5/1957 | Wernig | 49—485 X |
| 3,126,591 | 3/1964 | Hamilton | 49—489 |

DAVID J. WILLIAMOWSKY, *Primary Examiner.*

PHILLIP C. KANNAN, *Assistant Examiner.*